May 18, 1937. E. J. STORY 2,080,638
WOOD HEEL MACHINE
Filed June 5, 1934 4 Sheets-Sheet 1
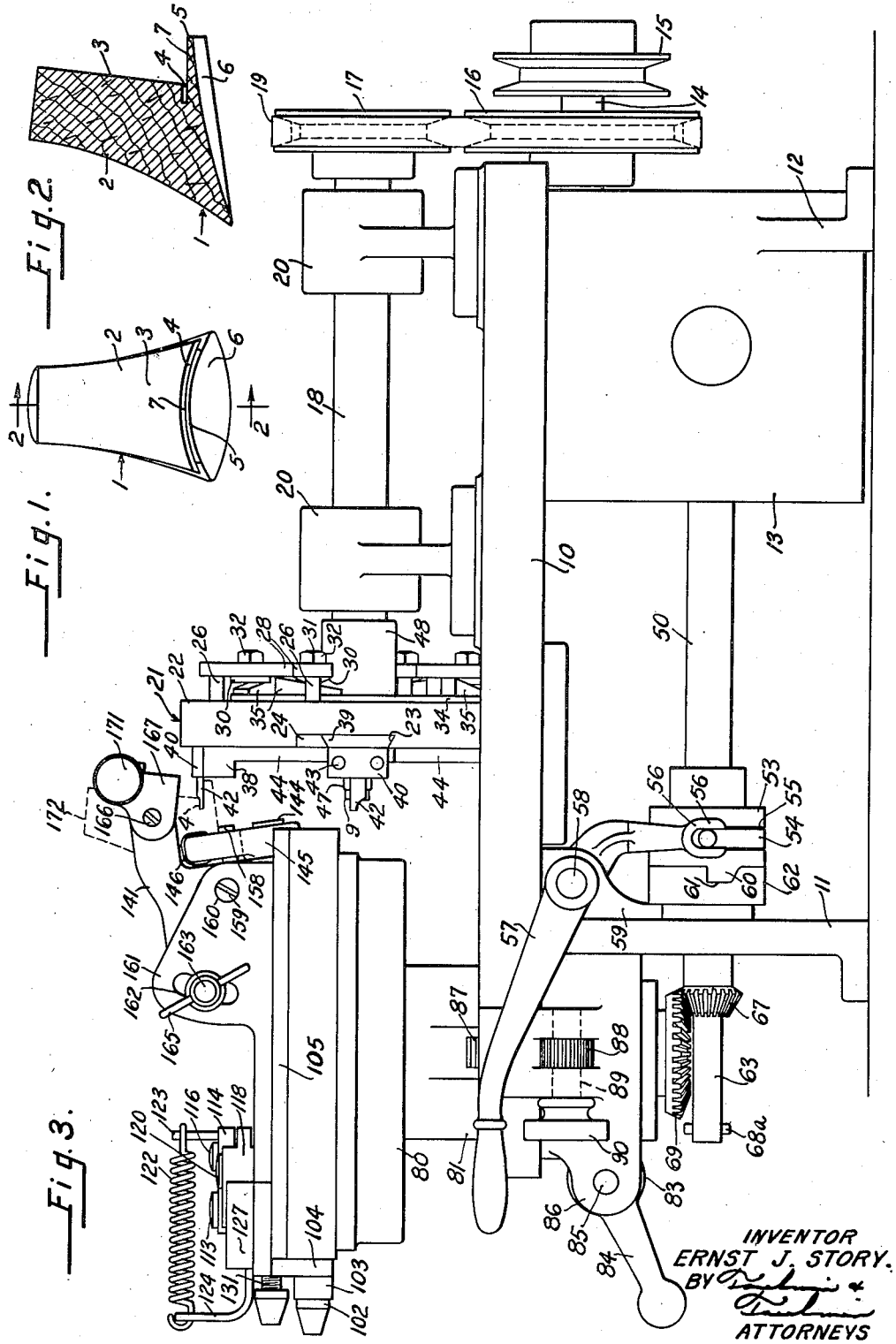
INVENTOR
ERNST J. STORY.
BY
ATTORNEYS May 18, 1937. E. J. STORY 2,080,638
WOOD HEEL MACHINE
Filed June 5, 1934 4 Sheets-Sheet 2
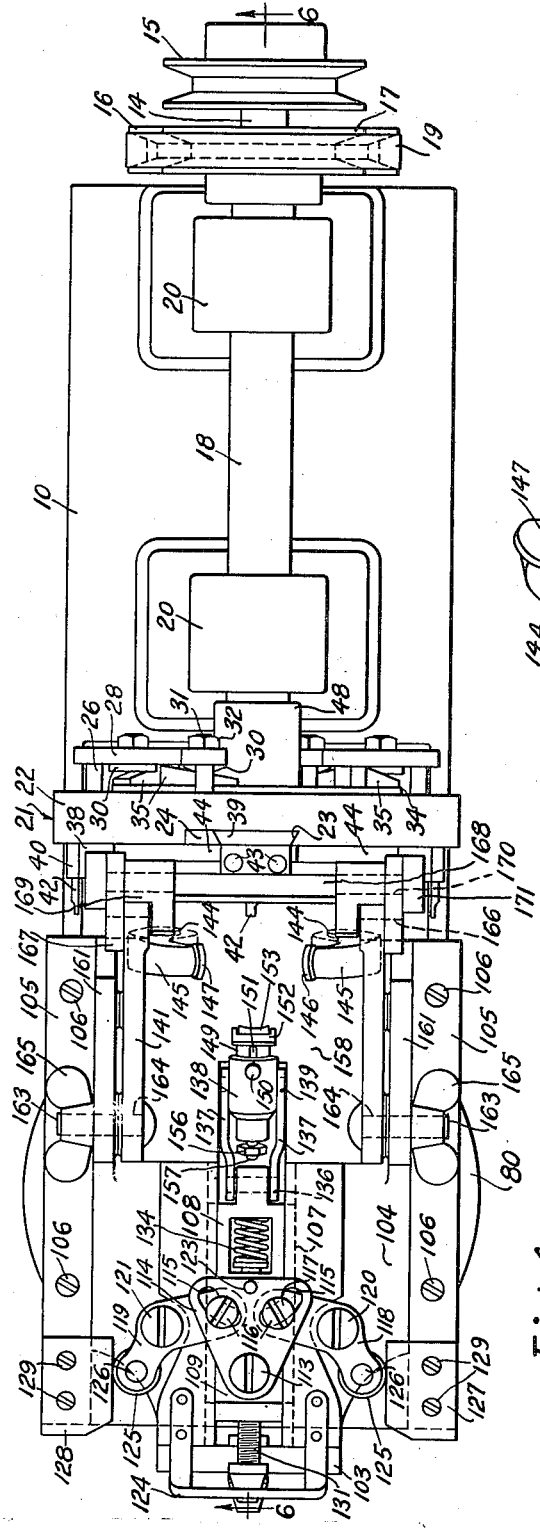
Fig. 4.
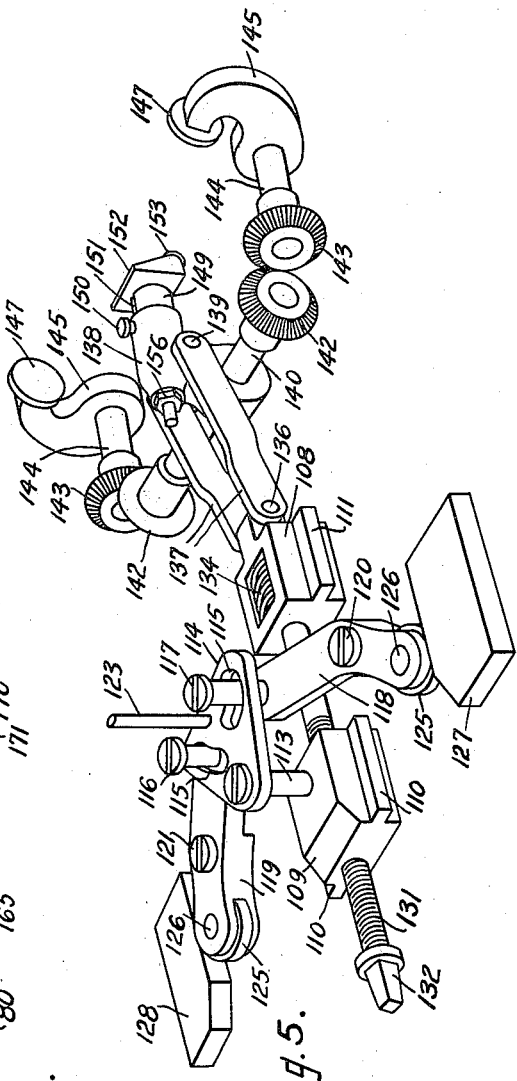
Fig. 5.
INVENTOR
ERNST J. STORY.
BY
ATTORNEYS May 18, 1937. E. J. STORY 2,080,638
WOOD HEEL MACHINE
Filed June 5, 1934 4 Sheets-Sheet 3
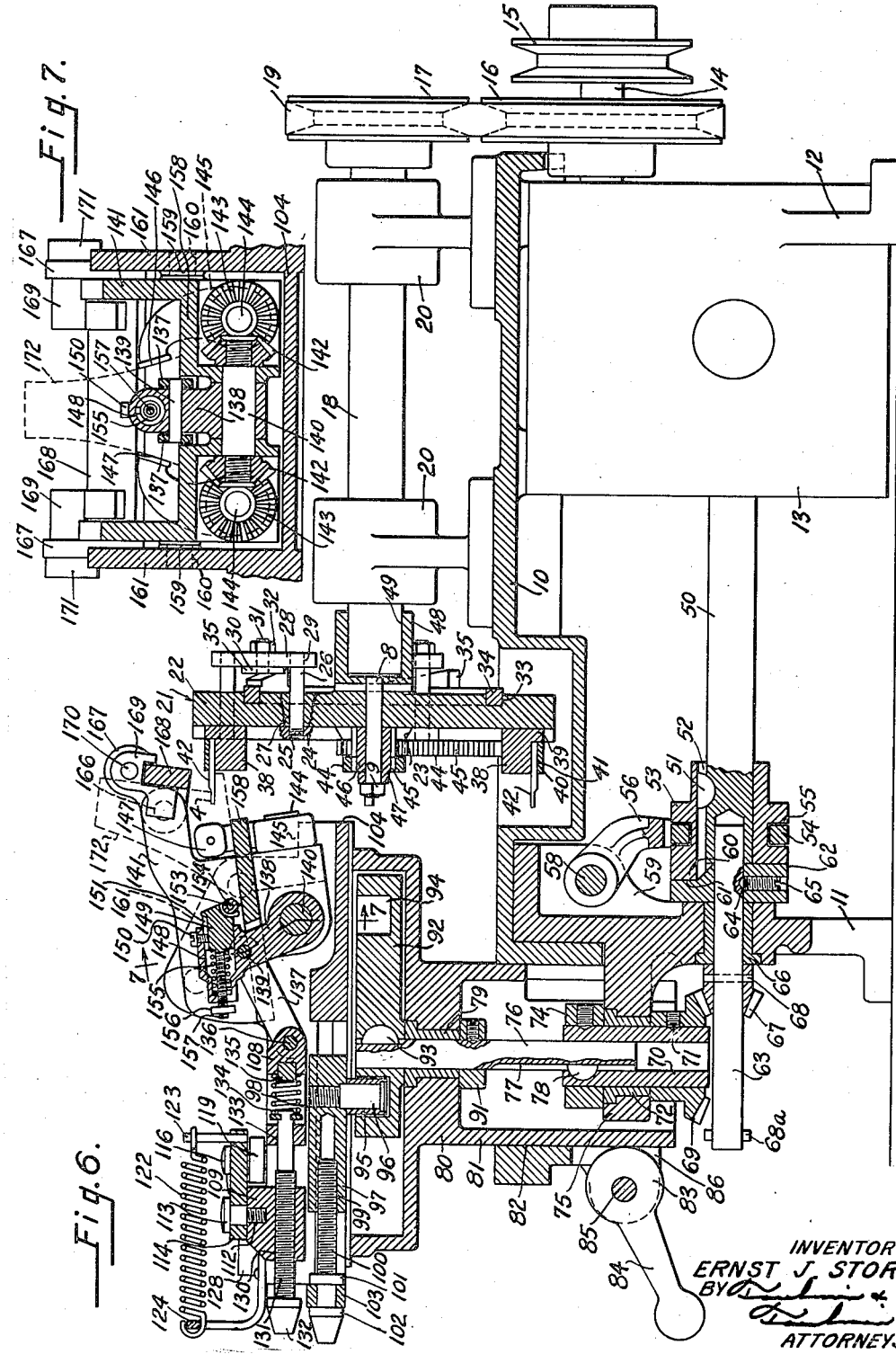
INVENTOR
ERNST J. STORY.
BY
ATTORNEYS

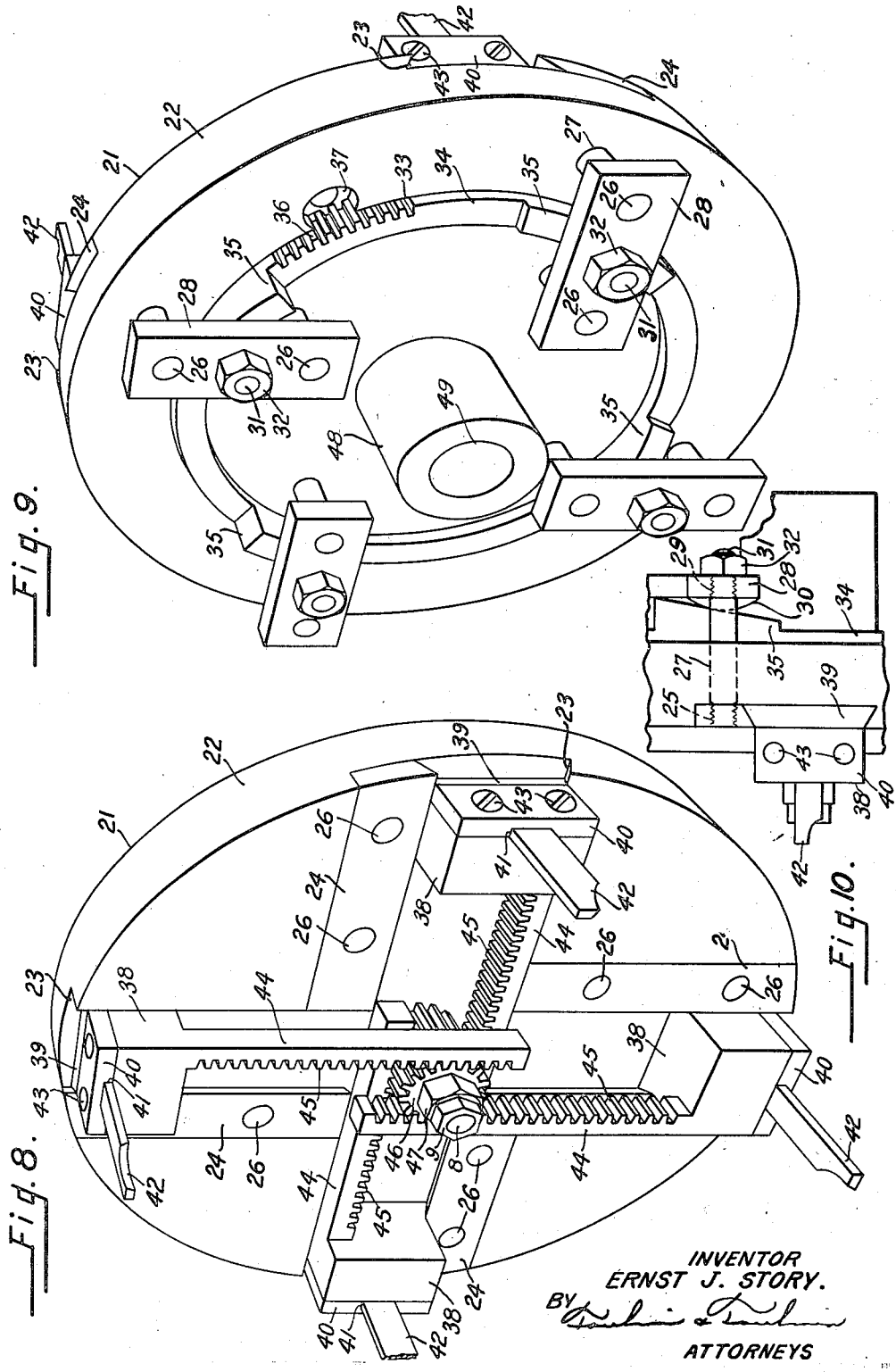

Patented May 18, 1937

2,080,638

UNITED STATES PATENT OFFICE 2,080,638

WOOD HEEL MACHINE

Ernst J. Story, Cincinnati, Ohio, assignor of one-half to John M. Delaney, Cincinnati, Ohio Application June 5, 1934, Serial No. 729,108

22 Claims. (Cl. 12—42)

This invention relates to machinery for forming wood heels, and especially for forming slots in such heels; particularly, arcuate slots.

One object of my invention is to provide a machine for forming slots in wood heels, these slots serving for the reception of the leather with which such heels are covered and also for more securely anchoring the heel to the shoe.

Another object is to provide a machine for forming arcuate slots at the base of the heel on its forward face, these slots being formed automatically.

Another object is to provide a machine having automatic feeding mechanism for feeding the heel toward the cutting tool.

Another object is to provide such a machine having a self-centering chuck with means for adapting itself to slight variations in heels.

Another object is to provide a machine with such a chuck having adjustments for various sizes and lengths of heels.

Another object is to provide a machine with such a chuck wherein the chuck arms are automatically tightened upon the work-piece when the chuck and the work-piece are fed toward the cutting tool.

Another object is to provide a machine for forming wood heels wherein the cutting stroke of the work-piece relative to the cutting tool is power-operated and adjustable as regards its limits of feeding motion.

Another object is to provide such a machine having a multiplicity of cutting tools which are simultaneously adjustable relative to one another and which can be simultaneously clamped in adjusted position.

Another object is to provide a method of machining shoe heels, which includes gripping the heel while feeding it toward the machining tool and releasing it while moving it away from the machining tool; and furthermore causing the motion of the heel-holder to operate the gripping and releasing action.

In the drawings:

Figure 1 is a front elevation of a wood heel with a slot formed by the machine of my invention;

Figure 2 is a central vertical section through the heel shown in Figure 1, along the line 2—2 thereof;

Figure 3 is a side elevation of the machine of my invention;

Figure 4 is a top plan view of my machine;

Figure 5 is a perspective view, in somewhat diagrammatic form, of the moving elements in the chuck and feeding mechanism of my machine, supporting parts being omitted for clarity;

Figure 6 is a side elevation, partly in section, of the machine shown in Figure 3, taken along the line 6—6 of Figure 4;

Figure 7 is a cross section through the chuck mechanism, taken along the line 7—7 of Figure 6;

Figure 8 is a perspective view of the front face of the cutting tool and cutting head;

Figure 9 is a perspective view of the rear face of the cutting head;

Figure 10 is a fragmentary side elevation, partly in section, showing the clamping mechanism for locking the cutting tools in their adjusted position.

General arrangement

Referring to the drawings in detail, Figure 1 shows a wood heel 1, having a vertical portion 2 with a front face 3. At the base of the front face 3 is an arcuate slot 4 extending forwardly, from which is an arcuately-formed tongue 5. The horizontal surface 6 of the heel is curved in slightly concave form in order to fit the shoe to which it is attached.

The purpose of the extension tongue 5 is to assist the anchoring of the heel to the shoe, and also to serve in providing a smooth joint between the leather sole and the heel. The end of the thin piece of leather covering the sole and forming a means of concealing the shoe structure beneath it is pushed into the slot 4. In this manner a tight and non-wrinkling connection is made, and the leather strip firmly joined to the heel without puckering or sagging. The extension tongue 5 is provided with an arcuately-curved upper surface 7.

The machine of my invention for forming the slots 4 in the wood heels, as above described, consists of a base 10 mounted upon legs 11 and 12. The leg 12 is associated with a gear box 13 containing the various reduction gearing and change-speed gearing suitable for providing the necessary speeds for the various operating parts of the machine. Power is communicated to the gear box 13 from the drive shaft 14, on which is mounted a drive pulley 15. Also mounted upon the main drive shaft 14 is a second pulley 16 which communicates power to a pulley 17 on the cutter shaft 18 through the agency of a belt 19. The cutter shaft 18 is rotatably mounted in bearing brackets 20 mounted upon the base 10.

Cutter head construction

Attached to the forward end of the cutter shaft 18 is the cutter head, generally designated 21, by which the various cutting tools are held and caused to operate upon the work pieces.

The cutting head 21 (Figures 8 and 9) consists of a disk-like member 22 having angularly-grooved slots 23 arranged in a cruciform manner and extending radially to the center of the disk 22. Along one side of each slot is a movable gib 24, which serves as a clamping member. Attached to each movable gib 24, as by the threaded connections 25 (Figure 10), is a pair of rods 26, passing through the bores 27 in the cutting head disk 22. The opposite ends of the rods 26 are attached to a crosshead 28, as by the threaded connection 29. In the middle of each crosshead 28 is a contact member 30, mounted on the stud 31 and held in place by the nut 32.

On the back face of the cutter head 21 (Figure 9) is an annular slot 33, in which a cam ring 34 is partially rotatable. The cam ring 34 is provided with wedge portions 35 adapted to engage the contact members 30 (Figure 10), when the ring 34 is turned.

The ring 34 is provided with teeth 36 for the rotation thereof. The cutter disk 22 is likewise provided with a socket 37, in which a toothed key may be inserted, the teeth on this key engaging the teeth 36 on the ring 34. Thus when the key is turned, the ring 34 moves, causing the wedge portions 35 to exert a clamping or unclamping action against the contact members 30. In this manner the movable gibs 24 are caused to exert a clamping or unclamping action, as may be desired.

Arranged to reciprocate in the grooved ways 23 are tool posts 38 (Figure 8), having correspondingly beveled base portions 39, adapted to fit the grooved ways 23 and the beveled gibs 24. The tool post 38 is provided with a clamping plate 40, which is provided with a groove 41, adapted to receive a cutting tool 42. The clamping plate 40 is secured to the tool post 38 by means of the clamp screws 43 (Figure 8).

Attached to each tool post 38 is a rack bar 44 having teeth 45 therealong. Each of these rack bars 44 is directed toward the center of the cutter head 21, and its teeth 45 mesh with the teeth of a gear 46 which is rotatably supported in the cutter head disk 22. The gear 46 may be rotated by means of the nut-like portion 47 forming its hub, this rotation being accomplished by the use of any suitable wrench. The cutter head 21 is provided with a boss 48 having a bore 49 for the purpose of receiving the cutter shaft 18. To this boss 48 is pinned the gear shaft 8, on which the gear 46 is mounted and held in place by the nut 9.

Accordingly, the cutting tools 42 may be adjusted relative to the cutter head disk 22 by loosening the clamping screws 43, thus placing the cutting edges of all the cutting tools 42 in such a position that they will engage the workpiece and take substantially the same cut. The cutting tools 42 may be moved radially in or out by releasing the clamping ring 34 by the toothed key previously mentioned, and applying a wrench to rotate the gear 46 (Figures 8 and 9). In this manner the tool posts 38 move simultaneously in or out as desired, the cutting tools 42 remaining at the same radial distances from the axis of rotation of the cutting head 21. When the cutting tools 42 have been placed at the desired distance from this axis of rotation, they are clamped in position by turning the clamping ring 34 by the use of the toothed key in the socket 37. This causes the gibs 24 to clamp the beveled portions 39 of the tool posts 38 firmly in the grooved ways 23.

Work-feeding mechanism

The power connection for feeding the work relative to the cutter head 21 and cutting tools 42 is received from the shaft 50 (Figures 3 and 6), which emerges from the change-speed gear box 13. Secured to the shaft 50, as by the key 51 working in the key-way 52, is a movable clutch collar 53. The latter is slidable to and fro along the shaft 50, this being governed by a clutch shipping ring 54, engaging an annular slot 55 in the clutch collar 53. The shipping ring 54 is engaged by a yoke 56 on the end of the clutch shipping lever 57, which is pivotally mounted on the stub shaft 58 supported in the bracket 59 attached to the machine leg 11.

The movable clutch collar 53 is provided with toothed portions 60, which engage corresponding slots 61 (Figure 3) in the opposite face of a fixed collar 62. The latter is drivingly attached to the shaft 63, as by the set screw 64, in the threaded hole 65. The shaft 63 is rotatably supported by the bearing sleeve 66 in the machine leg 11, on the opposite side of which is mounted a bevel gear 67, as by the pin 68. The free end of the shaft 63 is provided with a pin 68a, which may be engaged by a hand crank so that the connected mechanism may be rotated, if desired, by hand as well as by machine.

Meshing with the bevel gear 67 is a second bevel gear 69 secured to the sleeve 70, as by the set screw 71. The sleeve 70 is rotatably supported in the bearing sleeve 72, and held in position by the collar 74 on the opposite side thereof. The bearing sleeve 72 is mounted in the projecting arm 75 of the machine leg 11.

The sleeve 70 serves to drive a sliding shaft 76, having a slot 77, serving as a key-way and engaged by the key 78 secured to the sleeve 70. The sliding shaft 76 is mounted in the bearing sleeve 79 of the vertically movable housing 80 forming a support. The latter is provided with cylindrical side walls 81 movable vertically within a bore 82 in the machine base 10 (Figure 6) and clamped in any position by means of the cam 83 on the locking lever 84, mounted upon the pin 85 passing through the yoke portions 86 of the base 10. (Figure 3).

The movable housing 80 is provided with a rack 87, which is engaged by the toothed pinion 88 mounted upon the shaft 89 and turned by the hand wheel 90, secured thereto. (Figure 3). Thus by releasing the locking lever 84 and turning the hand wheel 90, the movable housing 80 may be moved up or down into any suitable position, and there clamped by shifting the locking lever 84 into its clamping position.

On the lower side of the bearing sleeve 79 is mounted a collar 91 secured to the shaft 76. On the upper end of the shaft 76 (Figure 6) is mounted a cam head 92, as by the key 93. The cam head 92 is provided with a cam groove 94 in its upper surface, arranged eccentrically to the axis of rotation of the shaft 76. Accordingly, when the clutch shipping arm 57 is moved so as to cause the clutch collars 53 and 62 to engage, and power is applied to the main driving pulley 15, the shaft 76 and its cam 92 will be rotated, causing the cam groove 94 to move eccentrically, and this will cause a cam follower to reciprocate.

Work-holding mechanism

Engaging the cam groove 94 (Figure 6) is a cam follower or roller 95 mounted upon the pin 96 threadedly secured to the slide member 97, as in the hole 98. The slide member 97 is provided with the threaded bore 99 which is engaged by the threaded adjusting screw 100. The latter has enlarged heads 101 and 102 arranged on opposite sides of the arm 103, which is secured to the main carriage 104. The head 102 is so formed as to receive a wrench. The main carriage 104 reciprocates in ways provided by the gibs 105 secured, as by the screws 106, to the movable housing 80. Consequently, when the adjusting screw 100 is turned, the main carriage 104 is caused to reciprocate relative to the movable housing 80, and thus caused to change its position relative to the axis of the shaft 76.

Chuck for holding work

The chuck mechanism for holding the wood heels, while they are being slotted, is mounted in grooved ways 107 and supported mutually by the slide blocks 108 and 109, having the ridges 110 and 111 respectively engaging the grooved ways 107. The slide block 109 is provided with a threaded socket 112, in which is secured a pin 113. Pivotally mounted upon the pin 113 is a triangular yoke piece 114 having slots 115, in which pins 116 and 117 are movable. The latter are secured in threaded sockets in the ends of the chuck-operating levers 118 and 119, these being pivotably mounted near their midpoints on the pivot screws 120 and 121, threaded into sockets in the main carriage 104. A coil spring 122 secured at one end to the pin 123 mounted on the yoke piece 114, and at the other end to the bracket 124 mounted on the main carriage 104, serves to urge the yoke piece backward. The outer ends of the chuck-operating levers 118 and 119 are provided with rollers 125, mounted upon pins 126, these rollers engaging the inner faces of a pair of tracks 127 and 128, mounted upon the gibs 105, as by the screws 129. In Figure 4 the spring 122 is omitted for clarity.

The slide blocks 108 and 109 serve to actuate the chuck mechanism proper. The slide block 109 contains the threaded bore 130, through which passes the adjusting screws 131, this adjusting screw being provided for tightening or loosening the chuck so as to adapt it to different sizes of heels. One end of the screw 131 is provided with a head 132, adapted to receive a wrench, whereas the other end passes through a bore 133 in the slide block 108, and engages one end of a coil spring 134, the opposite end of which is seated around the stud 135 and against the slide block 108. Accordingly, when the adjustment screw 131 is turned, the slide blocks 108 and 109 are caused to move toward or away from each other, thus adjusting the chuck mechanism for different sizes of heels, as will appear later.

Passing through the forward end of the slide block 108 is a pin 136, which serves as the pivot connection for a pair of links 137, these being pivotally attached at their opposite ends to the rear clamp arm 138 by the pin 139, forming trunnions therein. The rear clamp arm 138 is attached to the cross shaft 140, the latter being journaled in the tiltable bracket 141. The cross shaft 140 at its outer ends is provided with bevel pinions 142, which mesh with similar bevel pinions 143 mounted on the shafts 144, whose axes are at right angles to the cross shaft 140. The shafts 144 are likewise journaled in bearings in the tiltable bracket 141. On the ends of the shafts 144 are mounted the chuck side fingers 145, having the contact faces 146 and 147.

The rear clamp arm 138 has a hollow bore 148 at its outer end, this being adapted to receive a plunger 149 guided therein by the pin 150, engaging the groove 151 in the plunger 149. The outer end of the plunger 149 carries the rear chuck finger 152. The latter is provided with the contact roller 153 mounted upon the pin 154.

The plunger 149 is resiliently mounted in the bore 148 by means of the coil spring 155 seated in the bore 148, and adjustable by the nut 156 engaging the threaded shank 157 of the plunger 149. Accordingly, the rear chuck finger 152 is thus self-adjusting relative to the side chuck arms 145, when different lengths of heels are placed in the machine. The tiltable bracket 141 is provided with a table portion 158, which serves as a bottom rest for the heels placed in the machine.

The tiltable bracket 141 is mounted upon trunnions 159, which pivotally engage the bores 160 in the side arms 161 of the main carriage 104 (Figures 3 and 7). The latter contain the arcuate slots 162, having their centers lying on the axis of the trunnions 159. Clamping screws 163 pass through the holes 164 in the tiltable bracket 141 and likewise through the arcuate slots 162, being secured thereto by the wing nuts 165. Accordingly, when the wing nuts 165 are loosened, the tiltable bracket 141 may be angularly tilted around its trunnions 159 to the desired position. The wing nuts 165 are then tightened, thus locking the tiltable bracket 141 in its angled position.

The forward upper ends of the tilting bracket 141 are provided with trunnions 166, which serve as pivotal supports for the arms 167. The latter are joined by the front support bar 168, which passes across the space between them. The support bar 168 is carried by the members 169, which in turn are held in place by the screws 170 having the heads 171.

Operation

Before the machine is started, a heel of the type to be slotted is placed upside down in the chuck, as shown by the dotted lines 172 in Figure 6, and resting upon the member 158 of the tiltable bracket 141. The cutting tools 42 of the cutting head 21 are then adjusted in or out in the manner previously described, so that they will engage the heel at the proper point. The chuck itself is adjusted by means of the screw 132 for the particular size of the heel 172.

Due to the construction of the cam mechanism, the forward motion of the main carriage 104 causes the clamping figures 145 and 152 to clamp the heel, whereas its backward motion causes the heel to be released. The extent of this motion can be adjusted to the particular heel by attaching a hand crank to the shaft 63 (Figure 6) in such a position as to engage the pin 68. By turning this hand crank, the cam 92 may be caused to revolve and thus reciprocate the main carriage 104. Its limits of reciprocation may then be adjusted by turning the screw 100. As the cam 92 revolves and the main carriage 104 reciprocates relative to the gibs 105 (Figure 4), the rollers 125 engage the tracks 127 and 128, moving the ends of the chuck-operating levers 118 and 119. The opposite ends thereof move the pins 116 and 117, imparting a reciprocating motion to the slide block 109 by its connection to the pin 113.

When the slide block 109 reciprocates, the slide block 108 also reciprocates, moving the links 137 and accordingly swinging the rear clamp arm 138 in an angular direction. This action rotates the shaft 140 and likewise the shafts 144, moving the side chuck fingers 145 toward or away from one another while the rear chuck finger 152 is moving forward or backward.

The position of the heel and, therefore, of the heel rest 158, up or down relative to the cutting tools 42, may now be adjusted, if desired, by releasing the locking cam lever 84 and turning the hand wheel 90 (Figure 3). Through the action of the pinion 88 and the rack 87, the movable housing 80 is raised or lowered to the desired position. The locking cam lever 84 is then moved to its clamping position and the machine is ready for operation.

In operation the machine is connected to a suitable source of power, such as to an electric motor, by a belt engaging the main drive pulley 15. When this is rotated, the cutter shaft 18 and the countershaft 50 are rotated through their respective mechanisms. If now the clutch shipping lever 57 is so set as to connect the clutch, the shaft 63 revolves and the bevel gears 67 and 69 likewise cause the vertical shaft 76 and its cam 92 to revolve. As the cam 92 revolves, its eccentric groove 94 causes the roller 95 and its pin 96 to move backward and forward, reciprocating the main carriage 104. As the latter moves forward, the side chuck fingers 145 and the rear chuck finger 152 move into clamping engagement with the heel 172, holding it firmly while the rotating cutting tools 42 cut the slot 4 and the arcuate surface 7 upon the heel. As the main carriage 104 moves backward after this cut has been made, the clutch fingers automatically release themselves through the action of the clutch operating levers 118 and 119 against the tracks 127 and 128, and the heel may then be removed by the operator and another heel placed in position. In this manner the heels may be rapidly and accurately slotted, and quickly adjusted to any change in size. Slight variations in the dimensions of heels intended to be of the same size are automatically taken care of by means of the spring 134, serving as the resilient connection between the sliding blocks 108 and 109.

It will be understood that I desire to comprehend within my invention such modifications as may be necessary to adapt it to varying conditions and uses.

Having thus fully described my invention, what I claim as new and desire to secure by Letters Patent is:

1. In combination in heel-machining apparatus, a reciprocable carriage, means for cutting away a portion of the heel, a stop for limiting the positioning of the heel, a positioning member for urging the heel into engagement with the stop, laterally disposed clamping members comprising means for holding the heel mounted on said carriage, and means for simultaneously operating the holding means and reciprocating said carriage relatively to said cutting means, said carriage having devices operated by the reciprocation of said carriage adapted to grip the heel during the feeding stroke and to release the heel during the return stroke.

2. In combination in heel-machining apparatus, a reciprocable carriage, means for cutting away a portion of the heel, a stop for limiting the positioning of the heel, a positioning member for urging the heel into engagement with the stop, laterally disposed clamping members comprising means for holding the heel mounted on said carriage, means for simultaneously operating the holding means and reciprocating said carriage relatively to said cutting means, yielding means associated with said holding means to yieldingly grip said heel for accommodating varying sizes of heels, and devices operated by the reciprocation of said carriage for causing said positioning and clamping members to grasp the heel during the feeding stroke and to release the heel during the return stroke.

3. In combination in heel-machining apparatus, means for cutting away a portion of the heel, a stop for limiting the positioning of the heel, a positioning member for urging the heel into engagement with the stop, laterally disposed clamping members comprising means for holding the heel, and means for feeding said cutting means and holding means relative to each other and simultaneously operating the holding means, said holding means having devices adapted to adjust the position of said heel angularly relatively to said cutting means.

4. A work-holding device for heel-machining apparatus comprising a carriage, means on the carriage for gripping the heel, and means slidably mounted on the carriage and resiliently connected thereto for adjusting said gripping means angularly and linearly relatively to said support.

5. A work-holding device for heel-machining apparatus comprising a support, a carriage on the support, means on the carriage for supporting and gripping the heel, said means comprising a table having thereon gripping fingers, means for adjusting said gripping means to accommodate varying sizes of heels, and means for moving said carriage relatively to said support to feed the heel to machining devices.

6. A work-holding device for heel-machining apparatus comprising a support, a carriage thereon, a stop associated with said carriage for limiting the positioning of the heel longitudinally, means for gripping the heel on both sides laterally and for urging the heel against the stop, means for adjusting said gripping means to accommodate varying sizes of heels, means for moving said carriage relatively to said support to feed the heel to the machining devices, and means on the support to cause the gripping means to grip the heel and urge it against the stop during the feeding motion and to release it during the returning motion thereof.

7. A work-holding device for heel-machining apparatus comprising a support, a carriage mounted on said support for reciprocation relatively thereto, means to move said carriage to and from machining devices, a forwardly-disposed stop associated with said carriage for limiting the positioning of the heel, a rearwardly-disposed positioning member arranged to urge the heel against the stop, laterally disposed clamping members to grip the heel on its lateral sides, and means arranged between said carriage and said support and operated by the movement of said carriage to operate said positioning and clamping members to clamp the heels against said stop during the feeding movement of said carriage.

8. A work-holding device for heel-machining apparatus comprising a support, a carriage mounted on said support for reciprocation relatively thereto, means to move said carriage to and from the machining devices, a stop between the heel and the machining devices, a positioning member arranged to urge the heel forwardly against the stop, clamping members arranged to hold the heel on opposite sides, and means arranged between said carriage and said support and operated by the movement of said carriage to simultaneously operate said positioning and clamping members to clamp the heels against said stop during the feeding movement of said carriage and to release the heels from engagement with said stop during the return movement thereof.

9. In combination in heel-machining apparatus, means for holding a heel, means for cutting an arcuate slot in said heel, and means for feeding said heel-holding means and said cutting means relatively to one another to cut said slot, said cutting means comprising a rotary disc having cutting tools thereon and means for adjusting said cutting tools on the disc, whereby to vary the curvature of said arcuate slot.

10. In combination in heel-machining apparatus, means for holding a heel, means for cutting an arcuate slot in said heel, and means for feeding said heel-holding means and said cutting means relatively to one another to cut said slot, said cutting means comprising a rotary disc having cutting tools thereon and means for adjusting said cutting tools simultaneously, whereby to vary the curvature of said arcuate slot.

11. In a cutter, a disc-like member having in one side a plurality of radial slots, a tool post in each slot, clamp means in each slot to clamp the post therein, and a common means on the other side of said member to cause each clamp means to clamp its post.

12. In a cutter, a disc-like member having in one side radial slots, a tool post in each slot, clamp means in each slot to clamp the post therein, and a common cam member on the other side of the member to cause each clamp means to clamp its post.

13. In a cutter, a disc-like member having on one side clamp-operating members and on its other side radial slots with clamping members operatively connected to said clamp-operating members through said disc, a tool post slidably mounted in each slot, a common means arranged to engage said clamp-operating members for operating said clamping members simultaneously to clamp said tool posts in unison, a shaft fixed to the center of the disc, and means on the shaft operatively connected to the posts for sliding them in the slots.

14. In a cutter, a disc-like member having on one side a plurality of radially disposed slots, a tool post slidably mounted in each slot, a clamp member in each slot for clamping the post therein, a plurality of crossheads on the other side of said disc-like member, each crosshead being connected to a clamp member, and a single means acting on each of the crossheads to cause the clamp members to clamp the posts.

15. In a cutter, a disc-like member having on one side a plurality of radially disposed slots, a tool post slidably mounted in each slot, a clamp member in each slot for clamping the post therein, a plurality of crossheads on the other side of the disc-like member, each crosshead being connected to a clamp member, and a ring having thereon wedge portions to engage the crossheads to cause the clamp members to clamp the posts.

16. In a wooden heel machine, a cutting tool, a housing forming a support, a cam head in the housing having an axis of rotation and a cam groove eccentric to the axis of rotation, a carriage slidably mounted on the housing relatively to said cutting tool, a slide member adjustably mounted on the carriage and having a pin projecting into the cam groove, whereby a rotation of the head will reciprocate the carriage, and heel-holding means on the carriage.

17. In a wooden heel machine, a cutting tool, a housing forming a support, a cam head in the housing having an axis of rotation and a cam groove eccentric to the axis of rotation, a carriage slidably mounted on the housing relatively to said cutting tool, a slide member adjustably mounted on the carriage and having a pin projecting into the cam groove, whereby a rotation of the head will reciprocate the carriage, and heel-holding means on the carriage, said means comprising an adjustable table having thereon heel-clamping means and cooperating means on the carriage and the housing to operate the clamping means when the carriage reciprocates.

18. In a wooden heel machine, a cutting tool, a housing forming a support, a cam head in the housing having an axis of rotation and a cam groove eccentric to the axis of rotation, a carriage slidably mounted on the housing relatively to said cutting tool, a slide member adjustably mounted on the carriage and having a pin projecting into the cam groove, whereby a rotation of the head will reciprocate the carriage, and heel-holding means on the carriage, said means comprising an adjustable table having thereon heel-clamping means comprising a resiliently supported rear chuck finger and a pair of chuck arms, and cooperating means on the carriage and the housing to operate the clamping means when the carriage reciprocates.

19. In a wooden heel machine, a cutting tool, a housing forming a support, a cam head in the housing having an axis of rotation and a cam groove eccentric to the axis of rotation, a carriage slidably mounted on the housing relatively to said cutting tool, a slide member adjustably mounted on the carriage and having an instrumentality thereon projecting into the cam groove, whereby a rotation of the head will reciprocate the carriage, a heel-supporting table adjustably mounted on the carriage, heel-gripping means on the table, and cooperating means on the table and the housing to operate the heel-gripping means as the carriage reciprocates.

20. In a wooden heel machine, a cutting tool, a housing forming a support, a cam head in the housing having an axis of rotation and a cam groove eccentric to the axis of rotation, a carriage slidably mounted on the housing relatively to said cutting tool, a slide member adjustably mounted on the carriage and having an instrumentality thereon projecting into the cam groove, whereby a rotation of the head will reciprocate the carriage, a heel-supporting table adjustably mounted on the carriage, heel-gripping means on the table, and cooperating means on the table and the housing to operate the heel-gripping means as the carriage reciprocates, said cooperating means comprising a block slidably mounted on the carriage and operatively connected to the gripping means, a second block slidably mounted on the carriage and adjustably and resiliently connected to the first-named block, a spring connecting the second block to the carriage and a loose lever connection between the second block and the housing.

21. In a wooden heel machine, a cutting tool, a housing forming a support having thereon a pair of tracks, a cam head in the housing having an axis of rotation and a cam groove eccentric to the axis of rotation, a carriage slidably mounted on the housing between the tracks relatively to said cutting tool, a slide member adjustably mounted on the carriage and having thereon an instrumentality projecting into the cam groove, whereby a rotation of the head will reciprocate the carriage, a heel-supporting table adjustably mounted on the carriage, heel-gripping means on the table, and means on the carriage cooperating with the tracks to operate the gripping means as the carriage reciprocates.

22. In a wooden heel machine, a cutting tool, a housing forming a support having thereon a pair of tracks, a cam head in the housing having an axis of rotation and a cam groove eccentric to the axis of rotation, a carriage slidably mounted on the housing between the tracks relatively to said cutting tool, a slide member adjustably mounted on the carriage and having thereon an instrumentality projecting into the cam groove, whereby a rotation of the head will reciprocate the carriage, a heel-supporting table adjustably mounted on the carriage, heel-gripping means on the table, and means on the carriage cooperating with the tracks to operate the gripping means as the carriage reciprocates, said means comprising a block slidable on the carriage and operatively connected to the gripping means, a second block slidably mounted on the carriage and adjustably and resiliently connected to the first-named block, a triangular yoke-piece on the second block, said yoke-piece having therein a pair of arcuate slots, a spring connecting the yoke-piece to the carriage, and a pair of levers pivoted intermediate their ends on the carriage, each lever having on one end a pin fitting in an arcuate slot and on its other end a roller engaging a track.

ERNST J. STORY.